M. FOREACRE.
Sheep Rack.
No. 54,138. Patented April 24, 1866.
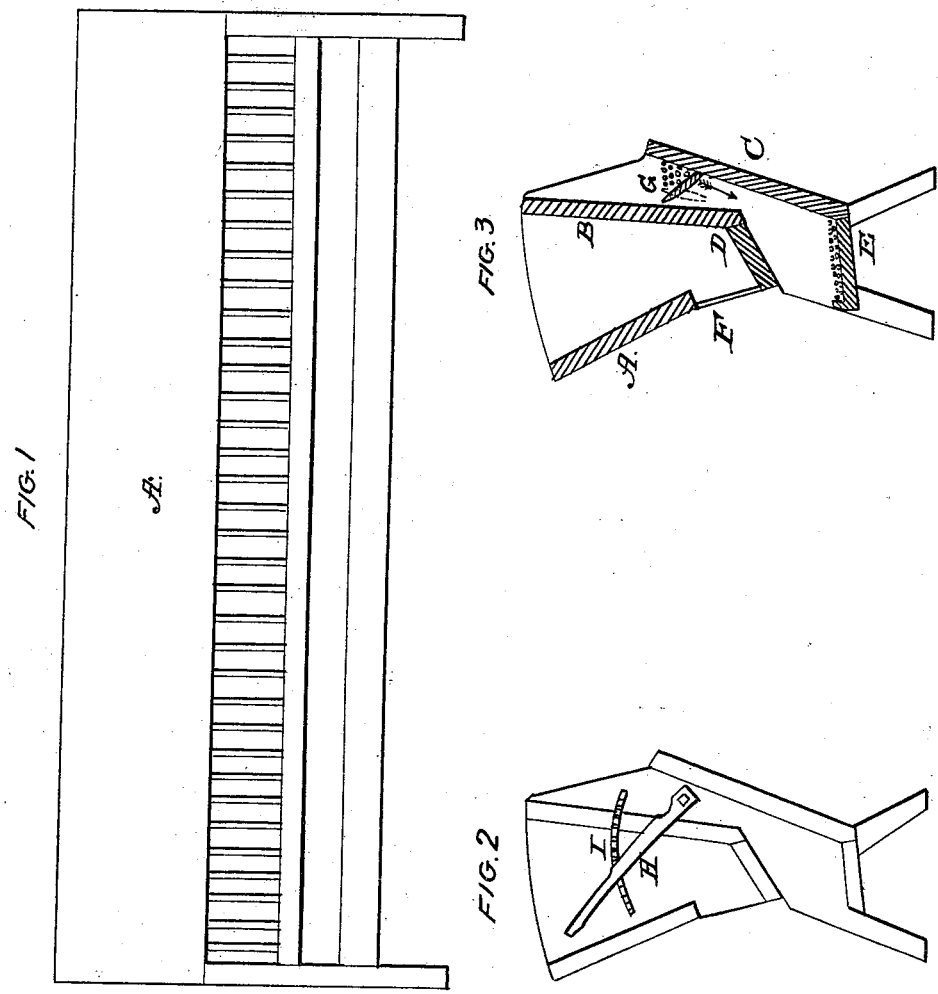

UNITED STATES PATENT OFFICE.

M. FOREACRE, OF NEW HARRISBURG, OHIO.

IMPROVEMENT IN SHEEP-RACKS.

Specification forming part of Letters Patent No. 54,138, dated April 24, 1866.

*To all whom it may concern:*

Be it known that I, M. FOREACRE, of New Harrisburg, in the county of Carroll and State of Ohio, have invented a new and useful Improvement in Sheep-Racks; and I do hereby declare that the following is a full and exact description thereof, reference being had to the accompanying drawings, and to the letters of reference marked thereon.

My invention consists of a peculiar construction of hay and grain racks combined for feeding sheep.

In the accompanying drawings, Figure 1 is a front view of my improved sheep-rack. Fig. 2 is an end view of the same. Fig. 3 is a transverse section of the rack.

My improved sheep-rack is intended for both hay and grain, and has two separate compartments and two bottoms—one for hay and the other for grain. The sides of both divisions are made of boards A B C, inclined at different angles, and the two bottoms D and E are also inclined forward and downward. Thus these five main boards, when fastened together and to the end pieces, serve to brace each other and to prevent the rack from bending. In the front of the rack there is a series of short rounds, F, to enable the sheep to feed upon hay in the usual manner. The rounds are very near together, just admitting the nose of the sheep and not the head—say nearly to the eyes. The board A prevents the hay-seed from falling upon the wool of the sheep, and the inclination of the bottom D directs both the hay-seed and the hay itself forward as they slide down in the rack. The lower bottom or trough, E, projects forward beyond the front of the bottom D, so as to catch any seed or fragments of hay falling from the hay-rack proper. On the back side of the rack is arranged a false or secondary trough with a falling bottom, G, which is locked and also turned by means of the lever H. This lever being caught into the ratchet I and the bottom G thus held in the position shown in blank lines, Fig. 3, the grain may be put into this upper or false trough, the same being scattered the whole length of the rack and also in a large number of racks, if desired, as though you were feeding the whole flock of sheep, and yet none of the sheep will get any of the grain. Now, the sheep should be first fed with hay or fodder, so they will all arrange themselves at the rack or racks, ready for the grain when it is let down. All things being thus ready, the lever H is unlocked, when the bottom G turns or falls, as indicated in red lines, Fig. 3, and the grain falls into the lower trough, E, and all the sheep drop their heads from the hay and begin to eat grain at the same time without leaving their places.

The details of construction of my rack may be somewhat varied without departing from my invention, so long as the rack is substantially the same; and the false trough or dropping bottom G may be used with a hay-rack of different construction or in a grain-trough alone, though there is a great advantage, as above stated, in combining the hay-rack and grain-trough.

I have proposed and tried different forms of racks; but I prefer the one above described.

A swinging board may be used in the lower trough to shut out and admit the sheep; but the secondary trough is better.

Having thus fully described my invention, what I claim, and desire to secure by Letters Patent of the United States, is—

1. The above-described combination of hay-rack and grain-trough, the whole being constructed substantially as set forth.

2. Making the upper part of the front of the hay-rack of the board A, in combination with short rounds F, for the purpose of preventing the hay-seed from falling into the wool of the sheep, substantially as specified.

MASCULINE FOREACRE.

Witnesses:
 ROBERT WILSON,
 MATSON AYRES.